United States Patent
Xirouchakis et al.

(10) Patent No.: US 10,892,885 B2
(45) Date of Patent: Jan. 12, 2021

(54) OFDM SYNCHRONIZATION EVALUATION

(71) Applicant: Sequans Communications S.A., Colombes (FR)

(72) Inventors: Ioannis Xirouchakis, Colombes (FR); Karim El Asmar, Colombes (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 0 days.

(21) Appl. No.: 16/387,190

(22) Filed: Apr. 17, 2019

(65) Prior Publication Data
US 2020/0336281 A1 Oct. 22, 2020

(51) Int. Cl.
*H04L 7/00* (2006.01)
*H04B 17/336* (2015.01)
*H04B 1/10* (2006.01)
*H04L 27/26* (2006.01)

(52) U.S. Cl.
CPC .......... *H04L 7/007* (2013.01); *H04B 1/1027* (2013.01); *H04B 17/336* (2015.01); *H04L 27/2657* (2013.01)

(58) Field of Classification Search
CPC ...... H04B 1/10; H04B 1/1027; H04B 7/0426; H04B 7/0857; H04B 17/336; H04L 7/00; H04L 7/0004; H04L 7/007; H04L 7/0083; H04L 7/0087; H04L 7/10; H04L 27/2614; H04L 27/265; H04L 27/2655; H04L 27/2657; H04L 27/2671; H04L 27/2672; H04L 27/2673; H04L 27/2675

USPC ........ 375/227, 260, 267, 354, 356; 370/208, 370/210, 350

See application file for complete search history.

(56) References Cited

U.S. PATENT DOCUMENTS

| | | | | |
|---|---|---|---|---|
| 6,587,517 B1 * | 7/2003 | Li | ........................ | H04B 1/707 375/316 |
| 7,421,041 B2 * | 9/2008 | Khandekar | ............. | H04L 1/005 375/316 |
| 8,368,763 B1 * | 2/2013 | Gossett | .................. | H04N 17/04 348/180 |
| 8,995,296 B2 * | 3/2015 | Toufik | .................. | H04B 17/382 370/252 |
| 2003/0099281 A1 * | 5/2003 | Gibson, Jr. | .......... | H04B 1/7075 375/136 |
| 2003/0142730 A1 * | 7/2003 | Lin | ...................... | H04B 1/7097 375/147 |
| 2005/0254601 A1 * | 11/2005 | Liu | ....................... | H04L 27/066 375/326 |
| 2007/0013583 A1 * | 1/2007 | Wang | ...................... | G01S 19/30 342/357.69 |
| 2011/0021171 A1 * | 1/2011 | Sturza | ................... | G01S 19/246 455/334 |
| 2017/0135052 A1 * | 5/2017 | Lei | ........................ | H04L 5/0048 |

* cited by examiner

*Primary Examiner* — Young T. Tse
(74) *Attorney, Agent, or Firm* — Hamilton, Brook, Smith & Reynolds, P.C.

(57) ABSTRACT

A method of evaluating OFDM synchronization between a transmitter and a receiver, the method carried out at the receiver and comprising, obtaining a non-coherent channel power estimate, obtaining a coherent channel power estimate, comparing the two estimates, and determining whether the receiver and the transmitter are synchronized based on the comparison.

19 Claims, 8 Drawing Sheets

20 — Obtaining a non-coherent channel power estimate

22 — Obtaining a coherent channel power estimate

24 — Comparing the two estimates

26 — Determining whether the receiver and transmitter are synchronised based on the comparison

OFDM SYNCHRONIZATION EVALUATION

This disclosure relates to the evaluation of synchronization between a transmitter and a receiver. It is particularly suited to evaluation of whether re-synchronization is required.

BACKGROUND

Orthogonal Frequency Division Multiplexing (OFDM) systems used in 3GPP Long Term Evolution (LTE), has a limitation of sensitivity to time and frequency offsets introduced into the underlying communications system. If the received signal is not synchronized in time and frequency to the transmitted signal, effects like Inter-Carrier-Interference (ICI) and Inter-Symbol-Interference (ISI) can have a severe impact on the receiver performance (i.e. increase in packet-error-rate when receiving control and/or data information packets). Degradation can occur even for offsets of a low number of Hz (for example a few hundred hertz) and a low number of samples (for example a few samples).

Furthermore, there can be cases where the receiver is completely desynchronized from a base station transmitter (for example an eNB in LTE) and cannot recover synchronization. This situation can occur when a receiver has been inactive and has not re-synchronized for a longer period of time, during which the time and/or frequency has drifted from the reference values to a point of no recovery. Examples of long periods of inactivity are discontinuous reception (DRX and eDRX), low power modes (LPM), power-saving-modes (PSM), and long uplink periods where downlink reception is not possible (e.g. PUSCH repetitions used from Category M devices). These inactivity periods can span a duration from a few seconds up to several hours or even days. Any presence of transmitter/receiver oscillator frequency offset would have a severe impact on synchronization during these long inactivity periods.

If a receiver cannot recover synchronization to the transmitter then it is necessary to perform re-synchronization. In LTE this is typically done by utilizing the Primary and Secondary Synchronization Signals (PSS/SSS) as would be understood. However, re-synchronization of a receiver to a serving cell after coming out of a long inactivity period may not be straight forward because the time/frequency offsets have exceeded the capture ranges of the time/frequency estimators and cannot, therefore, be corrected. In the absence of an efficient metric that indicates if the receiver is synchronized to the cell, the receiver can be stuck in a state where neither receiving and/or transmitting new packets nor recovering synchronization is possible.

This situation can occur systematically after every inactivity period and can degrade the overall performance of the OFDM system.

Accordingly, there is a need to design a method to overcome these challenges.

SUMMARY

According to an aspect there is provided method of evaluating OFDM synchronization between a transmitter and a receiver, the method carried out at the receiver and comprising obtaining a non-coherent channel power estimate, obtaining a coherent channel power estimate, comparing the two estimates; and determining whether the receiver and the transmitter are synchronized based on the comparison.

Optionally, the method wherein the determination is based on a pre-determined threshold.

Optionally, the method wherein the pre-determined threshold is based on receiver susceptibility to time and/or frequency offsets.

Optionally, the method wherein the pre-determined threshold is further based on a target SNR region.

Optionally, the method wherein determining comprises repeating the obtaining and comparing a pre-determined number of times, N, to form N instantaneous synchronization metrics.

Optionally, the method wherein the determining is based on the N instantaneous synchronization metrics.

Optionally, the method wherein each instantaneous synchronization metric is filtered to remove residual noise distortion.

Optionally, the method wherein N is based on the convergence time of the filter.

Optionally, the method wherein comparing further comprises determining a noise variance to eliminate residual noise power from the non-coherent channel power estimate.

Optionally, the method wherein comparing further comprises using the noise variance to eliminate residual noise power from the coherent channel power estimate.

Optionally, the method wherein the noise variance is determined using a coherent channel power estimate using a small coherent unit.

Optionally, the method where if it is determined that the receiver and transmitter are not synchronized, performing re-synchronization of the receiver to the transmitter.

Optionally, the method wherein obtaining a non-coherent channel power estimate is based on pilot symbols.

Optionally, the method wherein obtaining a non-coherent channel power estimate is further based on a multiplication of the received signal samples at the cell reference signal, CRS positions and the conjugate of the corresponding CRS.

Optionally, the method wherein obtaining a coherent channel power estimate is based on pilot symbols.

Optionally, the method wherein obtaining a coherent channel power estimate is further based on the number of pilot signals within a coherent unit in frequency and time.

According to a further aspect there is provided a processor programmed with instructions that when executed by the processor, cause the processor to carry out the method of the first aspect.

Optionally, the processor wherein the processor is positioned in a UE.

According to a third aspect there is provided a non-transient computer readable medium comprising instructions that when executed by a processor, cause the processor to carry out the method of the first aspect.

BRIEF DESCRIPTION OF THE DRAWINGS

Embodiments will now be described, by way of example only, and with reference to the drawings in which.

In the figures, like elements are indicated by like reference numerals throughout.

Overview

Figures 1A, 1B, 1C:
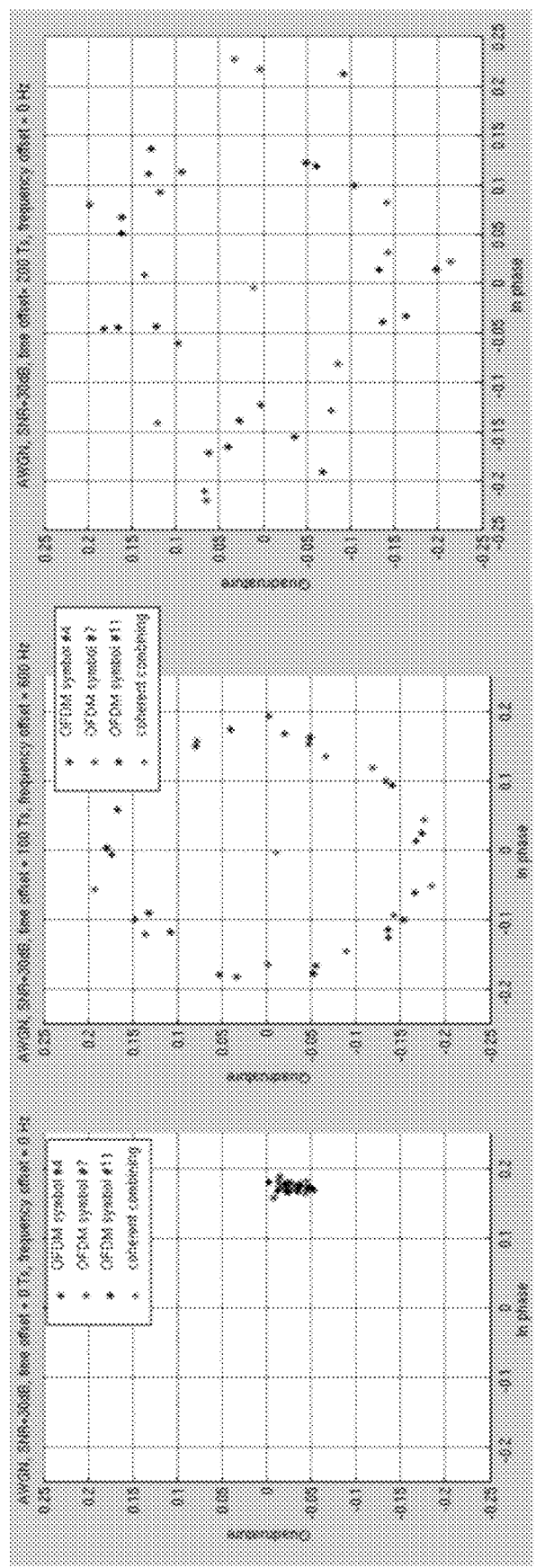
FIG. 1A illustrates CRS symbol behaviour in the absence of time/frequency offsets.
FIG. 1B illustrates CRS symbol behaviour in the presence of time/frequency offsets.
FIG. 1C illustrates FIG. 1B including ISI & ICI effects.

The method disclosed herein may be applied to any OFDM receiver using pilot symbols, including systems which use Multiple-Input-Multiple-Output (MIMO) antennas. When MIMO is available, each transmitter antenna is broadcasting a different pilot symbol so that the receiver can estimate the channel between each Tx/Rx path. For simplicity and without loss of generality, this disclosure is described in relation to a Single-Input-Single-Output (SISO) LTE system. However, the same concepts may be applied to any other OFDM system, SISO or MIMO, which uses pilot symbols.

DETAILED DESCRIPTION

With reference to the classical transmitter/receiver model of a single antenna transmitter and single antenna receiver (SISO), such an OFDM system comprising a cell transmitter (e.g. transmitter 100 within cell 102 in FIG. 6) and a UE receiver (e.g. receiver 104 of UE 106 in FIG. 6), can be expressed as:

$$y_l[k] = h_l[k] \cdot x_l[k] + n_l[k] \quad (1)$$

where:

l is the OFDM symbol index, k is the subcarrier index, $y_l[k]$, $x_l[k]$, are the received and transmitted QAM symbols at OFDM symbol l and subcarrier k, respectively, $n_l[k]$ is the frequency domain additive white Gaussian noise (AWGN) assumed to follow a normal distribution n~N(0, $\sigma_N^2$), where $\sigma_N^2$ is the noise variance, $h_l[k]$ represents the complex channel coefficient at subcarrier k during OFDM symbol l.

Cell Reference Signals (CRS) are pilot symbols transmitted by the transmitting cell (eNB) on predefined time/frequency resources and their position and values are known to the user equipment (UE) after initial synchronization as would be understood.

These signals are used for several purposes in LTE, typically channel estimation, Channel Quality Indicator (CQI) and Reference Signal Received Power & Quality (RSRP/RSRQ) computation.

At the CRS positions, the eNB transmits pre-defined CRS symbols $r_l[k]$:

$$y_l[k] = h_l[k] \cdot r_l[k] + n_l[k] \quad (2)$$

Thus, the UE may derive channel estimates $h_l[k]$ by multiplying the received signal samples at the pilot positions by the conjugate of the corresponding CRS, $r^*_l[k]$:

$$\hat{h}_l[k] = y_l[k] \cdot r^*_l[k] = h_l[k] + \tilde{n}_l[k] \quad (3)$$

given that $r_l[k] \cdot r^*_l[k] = |r_l[k]|^2 = 1$, $\forall l, k$. Notice that $\tilde{n}_l[k] = n_l[k] \cdot r^*_l[k]$ has the same statistical properties as $n_l[k]$.

In terms of channel power estimation:

$$P_{NC} = E\{|\hat{h}_l[k]|^2\} = P + \sigma_N^2 \quad (4)$$

where $P_{NC}$ denotes the "non-coherent" channel power estimation and P is the actual power of the channel. As discussed in relation to (1), channel estimates of (3) are subject to noise of variance $\sigma_N^2$. Typically, a receiver would reduce the noise variance of the channel estimates by coherently combining (or filtering) the channel estimates of (3) in order to obtain a noise-reduced estimation of the channel. However, coherent combining is effective only when channel estimates forming the coherent unit (the time and frequency resources within which coherent combining of the channel estimates occur) are within the coherence time $T_C$ and coherence bandwidth $B_C$ of the channel which depends on the experienced Doppler and delay spreads of the channel, respectively, as would be understood.

If the combined channel estimates span time beyond the coherence time or bandwidth beyond the coherence bandwidth), this could lead to non-constructive addition of the pilot symbols due to addition of rotated symbols as explained in relation to equation (13) below, and consequently, degradation of the channel estimation.

Improved channel estimates $\tilde{h}_l[k]$ using coherent combining in the absence of time and frequency offsets are given as:

$$\tilde{h}_l[k] = \frac{1}{K+1} \sum_{k'=-K/2}^{K/2} \frac{1}{L+1} \sum_{l'=-L/2}^{L/2} \hat{h}_{l-l'}[k-k'] \quad (5)$$

where K+1 and L+1 are the number of pilot symbols of the coherent unit in frequency and time directions, respectively.

It is noted that resource elements combined in the frequency direction span $K \cdot \Delta f \cdot df$ where $\Delta f$ is the OFDM subcarrier spacing and $df$ is the number of subcarriers that separate consecutive CRS in the frequency direction. Resource elements combined in the time direction span $L \cdot \Delta T \cdot dt$ where $\Delta T$ is the OFDM symbol duration and dt is the number of OFDM symbols that separate consecutive CRS in the time direction.

If $K \cdot \Delta f \cdot df < B_c$ and $L \cdot \Delta T \cdot dt < T_c$, then all combined CRS are within the coherent unit and we can then assume that $h_{l-l'}[k-k'] \approx h_l[k]$.

The coherent channel estimate can then be expressed as:

$$\tilde{h}_l[k] = h_l[k] + \frac{1}{(K+1)(L+1)} \sum_{k'=-K/2}^{K/2} \sum_{l'=-L/2}^{L/2} \tilde{n}_{l-l'}[k-k'] \quad (6)$$

Thus, in terms of channel power estimation:

$$P_c = E\{|\tilde{h}_l[k]|^2\} = P + \frac{\sigma_N^2}{(K+1)(L+1)} \quad (7)$$

where $P_c$ denotes "coherent" channel power estimation.

By comparing equations (4) and (7) it is seen that coherent combining reduces the channel power estimation noise effect by a factor of $$\frac{1}{(K+1)(L+1)}.$$

Assuming the presence of a timing offset of δ samples in an N sample/FFT (fast fourier transform) length OFDM system, it can be shown that the frequency domain effect on the received symbols is expressed as:

$$y_l[k,\delta] = y_l[k] \cdot \exp(j2\pi k\delta/N) + i_{ICI} + i_{ISI} \quad (8)$$

thus:

$$\hat{h}_l[k,\delta] = \hat{h}_l[k] \cdot \exp(j2\pi k\delta/N) + i_{ICI} + i_{ISI} \quad (9)$$

where $i_{ICI}$, $i_{ISI}$ are interference components due to ICI and ISI.

Assuming now a frequency offset normalized by the subcarrier spacing, $\varepsilon = f_{offset}/\Delta f$, where $f_{offset}$ is the frequency offset in Hz, it can be shown that the effect on the received time domain signal is expressed as:

$$y_l[n, \varepsilon] = y_l[n] \cdot \exp\left(\frac{j2\pi\varepsilon n}{N}\right) + i_{ICI} \quad (10)$$

From (10) it can be shown that channel coefficients at subcarrier k separated by D time domain samples in the presence of frequency offset ε have the following relationship:

$$h_{l+D}[k, \varepsilon] = h_l[k] \cdot \exp\left(\frac{j2\pi\varepsilon D}{N}\right) + i_{ICI} \quad (11)$$

Equations (10) and (11) practically show that timing and frequency offsets have the effect of phase rotations in the frequency and time domains, respectively, and the ISI/ICI cause interference. These effects are illustrated in FIGS. 1A, 1B and 1C. FIG. 1A illustrates CRS symbol behaviour in the absence of time/frequency offsets. FIG. 1B illustrates CRS symbol behaviour in the presence of time/frequency offsets. For comparison, FIG. 1C includes ISI & ICI effects.

In the following, ICI and ISI are ignored (the concept/performance of this disclosure is not affected), and it is assumed that their effect is integrated inside the noise component.

Figure 6:
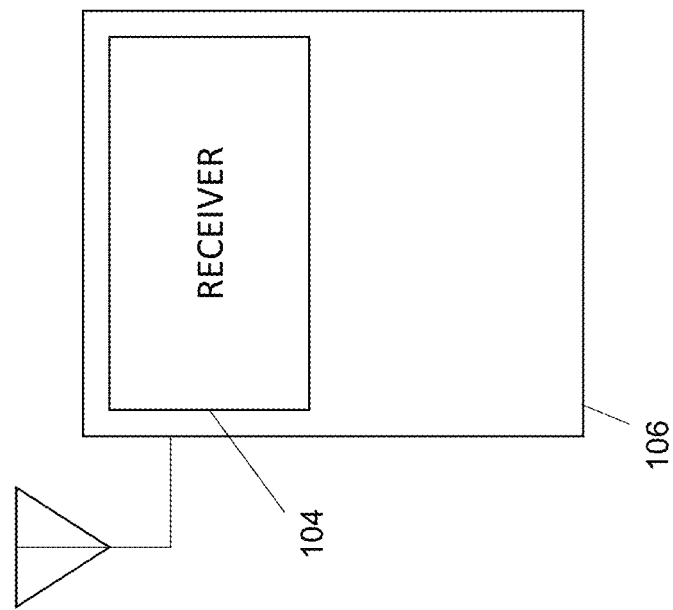
FIG. 6 illustrates a communications environment including a transmitter and a receiver.
Figure 6:
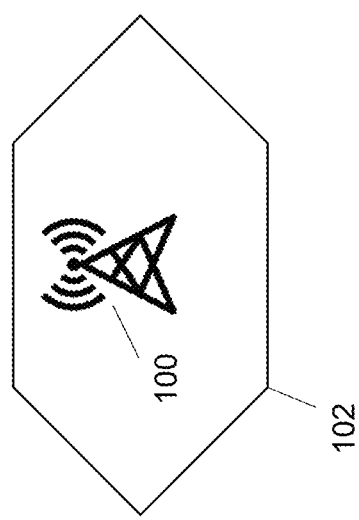

A method is disclosed that, when, applied in an OFDM receiver (such as the receiver 104 in FIG. 6), can determine the level of (combined) time and frequency synchronization of the OFDM receiver 104 (typically a UE 106) to the OFDM transmitter (typically a cell site or eNB), such as the transmitter 100 shown in FIG. 6. This method can further be used to determine whether synchronization in time and frequency is maintained between the transmitter 100 and the receiver 104. An estimated synchronization metric can then be used to indicate "in-sync", i.e. synchronization is still maintained, or "out-of-sync", i.e. synchronization is lost.

Figure 2:
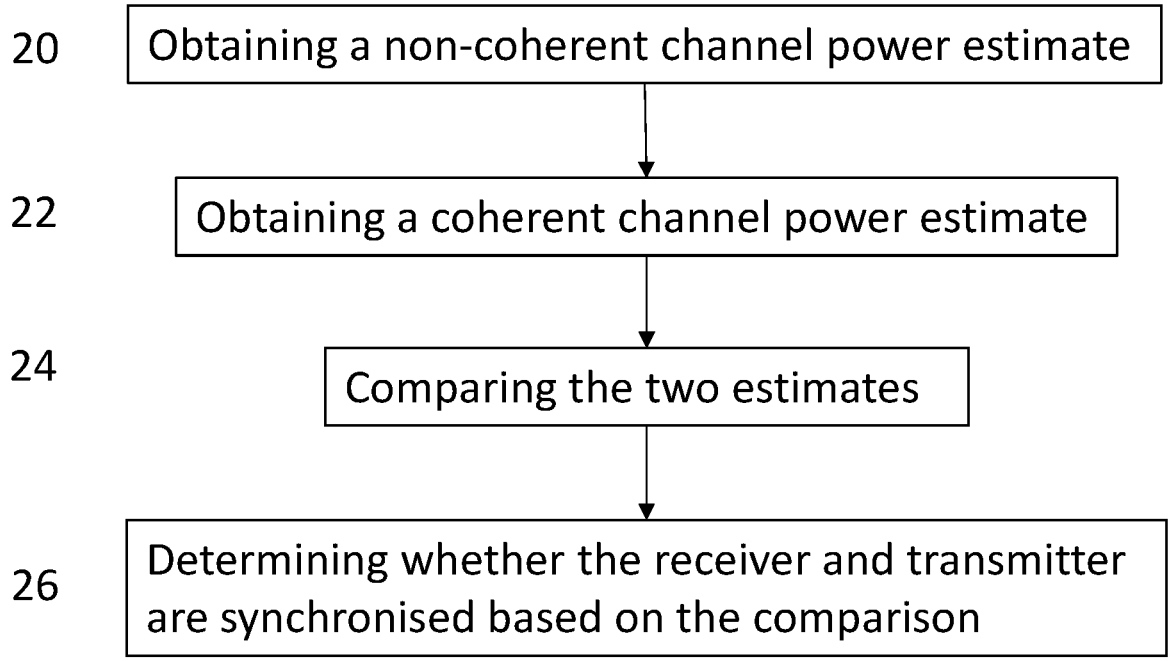
FIG. 2 illustrates a method of evaluating OFDM synchronization between a transmitter and a receiver.

Tuning to FIG. 2, a method of evaluating OFDM synchronization between a transmitter and a receiver is shown.

Figure 7:
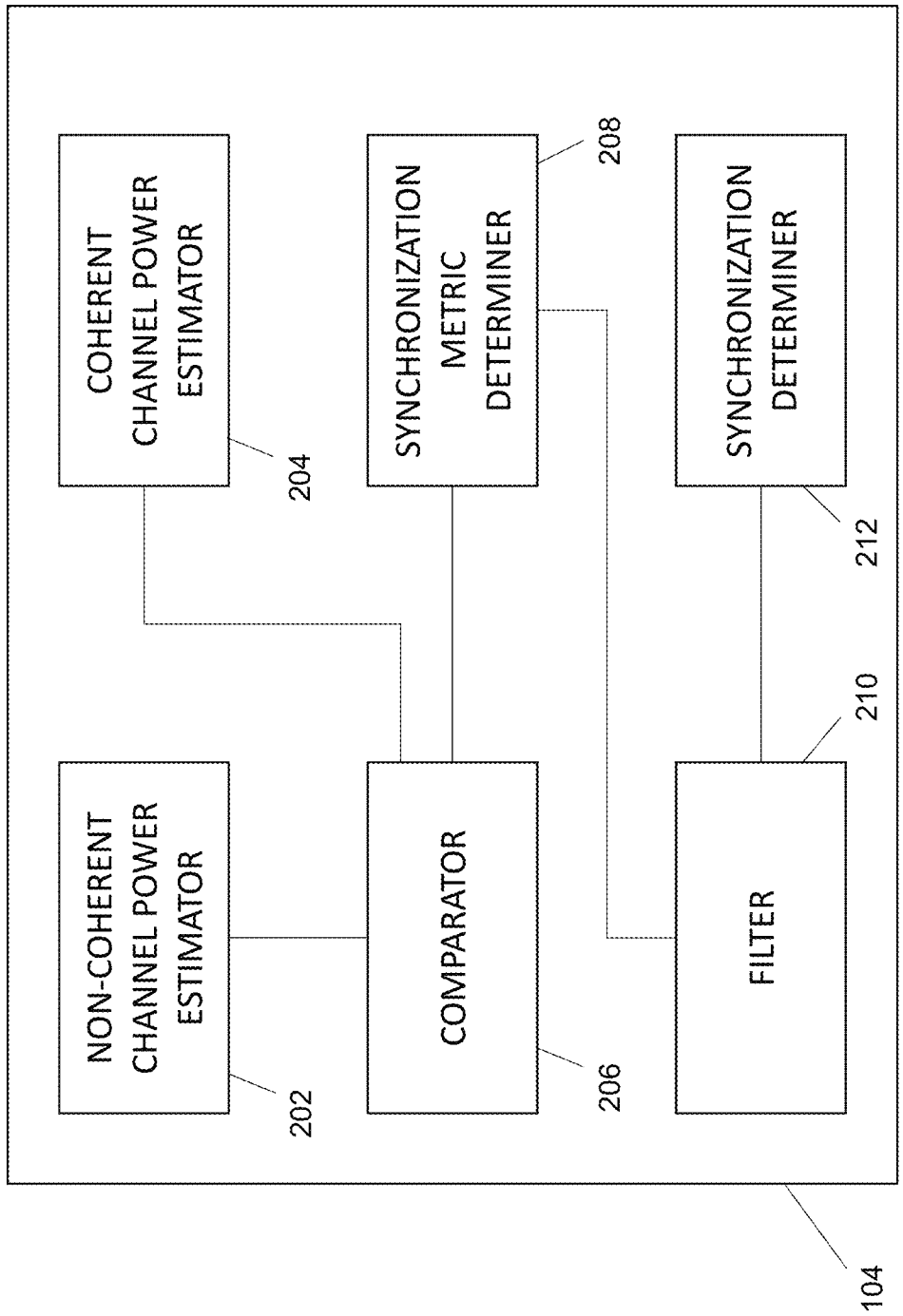
FIG. 7 illustrates a receiver arranged to carry out the method illustrated in FIG. 2.

In step 20, a non-coherent channel power estimate is obtained (e.g. by the non-coherent channel power estimator 202 of receiver 104 in FIG. 7). This may be derived by the UE 106 containing the receiver 104. The non-coherent channel power estimate may be based on pilot signals. This estimate may be further based on a multiplication of received signal samples at the cell reference signal (CRS) positions and the conjugate of the corresponding CRS.

In step 22, a coherent channel power estimate is obtained (e.g. by the coherent channel power estimator 204 of receiver 104 in FIG. 7). This may be derived by the UE 106 containing the receiver 104. The coherent channel power estimate may be based on pilot signals. This estimate may be further based on the number of pilot signals within a coherent unit in frequency and time (such as the coherent unit 302 shown in FIG. 8A).

In a step 24, the channel power estimate obtained using a non-coherent method is compared to the channel power estimate obtained using a coherent method (e.g. by the comparator 206 of receiver 104 in FIG. 7). The comparing may further comprise determining a noise variance to eliminate residual noise power from the non-coherent channel power estimate. The noise variance may be used to eliminate residual noise power from the coherent channel power estimate. Further, the noise variance may be determined using a coherent channel power estimate using a small coherent unit (such as the small coherent unit 304 shown in FIG. 8B).

In step 26, a determination is made as to whether the transmitter and receiver are synchronized based on the comparison (e.g. by the synchronization determiner 212 of receiver 104 in FIG. 7). If it is determined that the receiver 104 and transmitter 100 are not synchronized, re-synchronization of the receiver 104 to the transmitter 100 may be performed. The determination may be based on a pre-determined threshold. The pre-determined threshold may be based on receiver susceptibility to time and/or frequency offsets, and may be further based on a target SNR region. Steps 20, 22 and 24 may be repeated a pre-determined number of times, N, to form N instantaneous synchronization metrics (which may, for example, be formed by the synchronization metric determiner 208 of receiver 104 in FIG. 7). The determining may be based on the N instantaneous synchronization metrics. Each instantaneous synchronization metric may be filtered (e.g. by filter 210 of receiver 104 in FIG. 7) to remove residual noise distortion. N may be based on the convergence time of the filter 210.

It will be shown below that non-coherent channel power estimates are insensitive to time and frequency offsets, while coherent channel power estimates are sensitive. This means that when there is no frequency and no time offset (i.e. the receiver 104 is still synchronized to the transmitter 100) the coherent and non-coherent channel power estimates derive similar results.

However, in the presence of time and/or frequency offsets (i.e. the receiver 104 has lost synchronization to the transmitter 100), the coherent and non-coherent channel power estimates provide different results. Thus, the receiving device (typically a UE 106) can determine whether it is still synchronized to the transmitter 100 by comparing these two estimates.

By revisiting the non-coherent channel power estimations $P_{NC}$ in the presence of time and frequency offsets {ε, δ}:

$$P_{NC}[\varepsilon,\delta] = E\{|\hat{h}_{l+D}[k,\varepsilon,\delta]|^2\} = E\{|\hat{h}_{l+D}[k] \cdot \exp(j2\pi k\delta/N) \cdot \exp(j2\pi\varepsilon D/N)|^2\} = P + \sigma_N^2 \quad (12)$$

This is the same expression as equation (4) which means that non-coherent channel power estimation is robust against time and frequency offsets. This is because non-coherent power estimation only measures the squared magnitude of each CRS channel vector in the complex domain. Thus, the rotations of the CRS channel symbols in the complex domain caused by time/frequency offsets do not affect the calculation of the channel power because the magnitude of the non-coherent channel vectors, which are analogous to the channel power, remain constant on average. This was illustrated earlier in FIG. 1C.

By revisiting the coherent channel power estimations $P_C$ in the presence of time and frequency offsets $\{\varepsilon, \delta\}$ it cannot be assumed that $h_{l-l'}[k-k', \delta, \varepsilon] \approx h_l[k, \delta, \varepsilon]$ as would be understood. This is because the symbols within the coherent unit have rotated.

Thus, the symbol relative rotations are taken into account: i.e. $h_{l-l'}[k-k', \delta, \varepsilon] \approx h_l[k] \cdot \exp(j2\pi\delta\Delta k(k,k')/N) \cdot \exp(j2\pi\varepsilon D(l,l')/N)$, where $D(l,l')$ is the time separation between OFDM symbols l and l' in number of samples, and $\Delta k(k,k')$ is the frequency separation between subcarriers k and k' in number of subcarriers.

The coherent channel estimate in the presence of time and frequency offsets $\{\varepsilon, \delta\}$ is then:

$$\tilde{h}_l[k, \delta, \varepsilon] = \frac{1}{K+1} \sum_{k'=\frac{K}{2}}^{\frac{K}{2}} \frac{1}{L+1} \sum_{l'=\frac{L}{2}}^{\frac{L}{2}} \hat{h}_{l-l'}[k-k', \delta, \varepsilon] = \frac{1}{(K+1)(L+1)} \quad (13)$$

$$\hat{h}_l[k] \sum_{k'=\frac{K}{2}}^{\frac{K}{2}} \sum_{l'=\frac{L}{2}}^{\frac{L}{2}} \cdot \exp\left[\frac{j2\pi}{N}(\varepsilon \cdot D(l,l') + \delta \cdot \Delta k(k,k'))\right] =$$

$$\frac{1}{(K+1)(L+1)} \hat{h}_l[k] \sum_{k'=\frac{K}{2}}^{\frac{K}{2}} \sum_{l'=\frac{L}{2}}^{\frac{L}{2}} \cdot \exp[j\vartheta_{l-l'}(k-k')] = \frac{1}{(K+1)(L+1)}$$

$$h_l[k] \sum_{k'=-\frac{K}{2}}^{\frac{K}{2}} \sum_{l'=-\frac{L}{2}}^{\frac{L}{2}} \cdot \exp[j\vartheta_{l-l'}(k-k')] +$$

$$\frac{1}{(K+1)(L+1)} \sum_{k'=-\frac{K}{2}}^{\frac{K}{2}} \sum_{l'=-\frac{L}{2}}^{\frac{L}{2}} \tilde{n}(k-k')$$

where we substituted $$\vartheta_{l-l'}(k-k') = \frac{2\pi}{N}(\varepsilon \cdot D(l, l') + \delta \cdot \Delta k(k, k')).$$

Figures 3A, 3B:
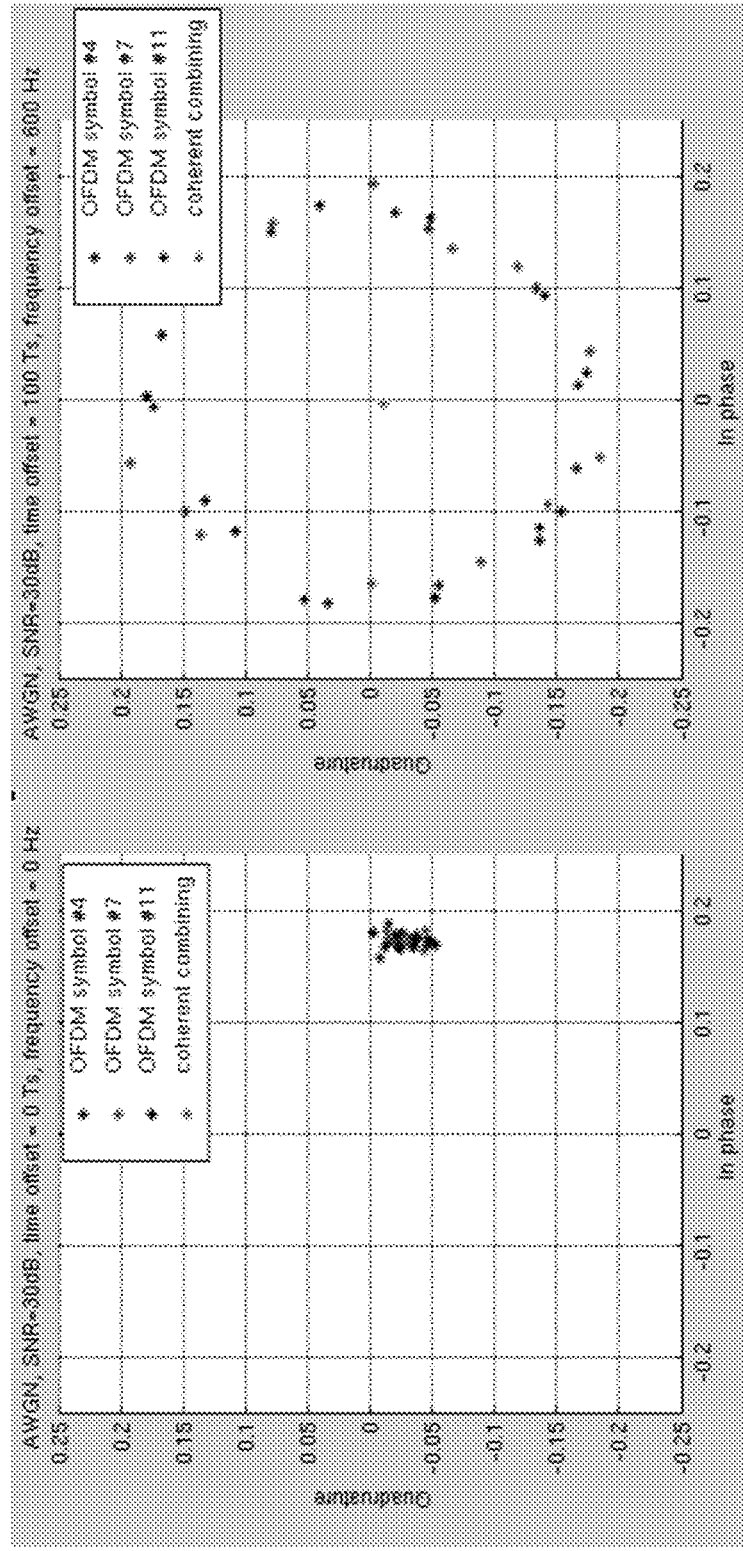
FIG. 3A illustrates coherent combining behaviour in the absence of time/frequency offsets.
FIG. 3B illustrates coherent combining behaviour in the presence of time/frequency offsets.

FIG. 3A illustrates the effect on the coherent combining in the absence of time and frequency offsets. Without offsets, the CRS combining of eq. (6) is performed constructively and provides a noise-reduced channel estimate. FIG. 3B illustrates the effect on the coherent combining in the presence of time and frequency offsets. With offsets and due to rotations, the CRS combining of eq. (13) is performed de-constructively and the combined channel estimate collapses to a vector with a small magnitude.

By revisiting the coherent channel power estimations $P_C$ in the presence of time and frequency offsets $\{\varepsilon, \delta\}$:

$$P_C[\varepsilon, \delta] = E\{|\tilde{h}_l[k, \delta, \varepsilon]|^2\} = P \cdot \kappa(\varepsilon, \delta) + \frac{\sigma_N^2}{(K+1)(L+1)} \quad (14)$$

where $0 \leq \kappa(\varepsilon, \delta) \leq 1$ represents the power of the average of the exponents of (13) for $\{\varepsilon, \delta\}$ rotations. The behaviour of the statistics of K depends on the coherent unit selection and the time/frequency offsets $\{\varepsilon, \delta\}$.

Assuming: $\vartheta_{l-l'}(k-k') \sim U(-\pi,\pi)$, then it can be that $\kappa \to 0$. This example is depicted in FIG. 2. However, this assumption does not always hold because for small $\{\varepsilon, \delta\}$ offsets, the time/frequency rotations do not extend to the entire $(-\pi,\pi)$ plane. However, $\kappa \to 1$ only when $\varepsilon=0$ and $\delta=0$ and that $0 \leq \kappa < 1$ when $\{\varepsilon \neq 0, \delta \neq 0\}$. This is because term K represents the power of sum of rotators of different phases and practically becomes unity only in the absence of timing and frequency offsets.

When comparing the non-coherent channel power estimate $P_{NC}$ of (12) and the coherent channel power estimate $P_C$ of (14), we get:

$$\frac{P_C}{P_{NC}} = \frac{P \cdot \kappa + [\sigma_N^2/(K+1)(L+1)]}{P + \sigma_N^2} \quad (15)$$

In order to remove noise bias from the comparison, the noise components of (15) need to be handled. Initially, this means that a noise variance estimate is needed. The estimation of the noise variance in the presence of time/frequency offsets is not straightforward. This is because typically the estimation of the noise variance involves the comparison of the power of the received signal y to the power of the noise-reduced coherent channel estimate $\tilde{h}$:

$$\widetilde{\sigma_N^2} = E\{|y|^2 - |\tilde{h}|^2\} \quad (16)$$

Figure 8B:
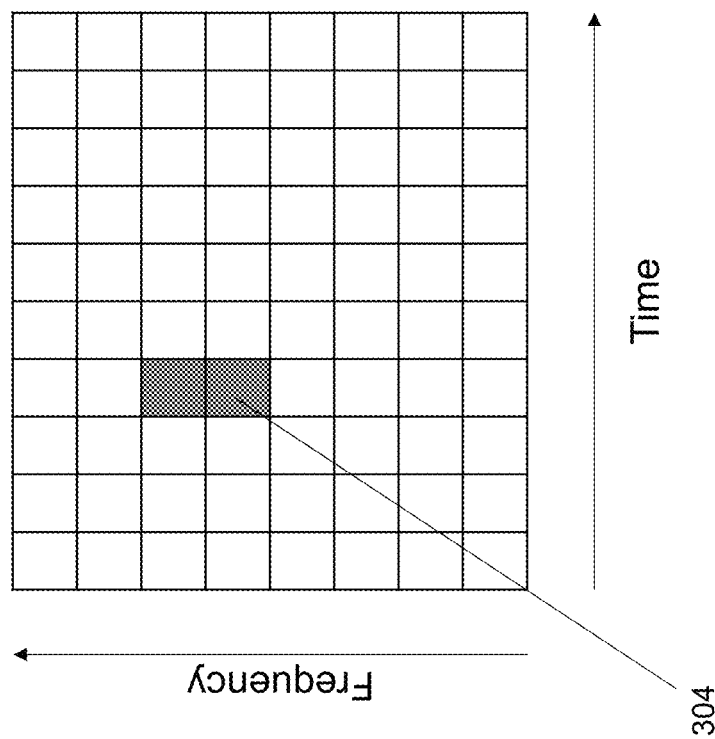
FIG. 8B illustrates a small coherent unit in frequency and time.
Figure 8A:
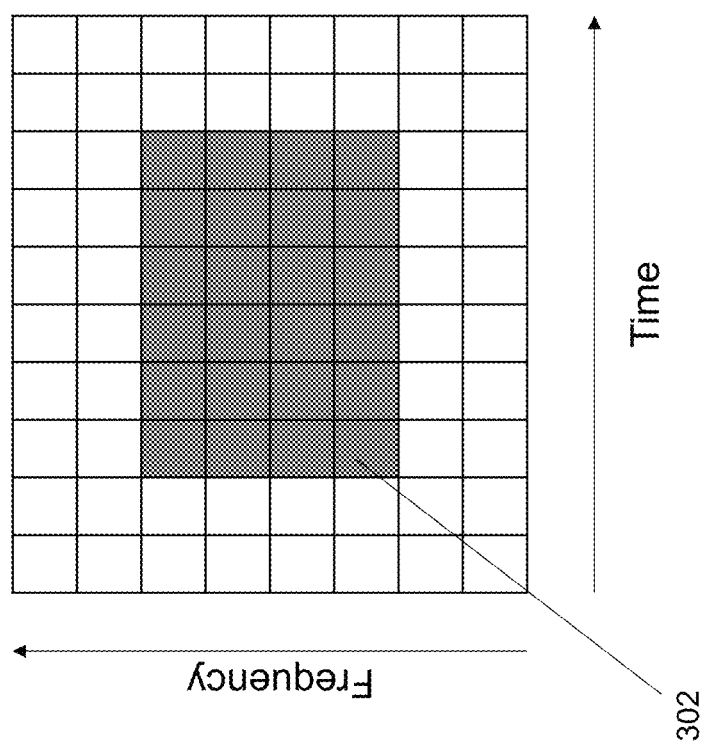
FIG. 8A illustrates a coherent unit in frequency and time.

With the explanation of equation (14) it was shown that the estimation of $|\tilde{h}|^2$ in the presence of time/frequency offsets is problematic. However, if a very small coherent unit is selected, then the noise variance estimation is still reliable enough to derive accurate noise variance estimation. The smallest coherent unit to choose is when K=1 and L=0 as would be understood, as shown in FIG. 8B. From substituting into equations 14 and 15, this leads to a coherent unit of two subcarriers and a single OFDM symbol. In this case, $\kappa \to 1$ and $P_{NC} - P_C = \sigma^2/N/2$, hence:

$$\widetilde{\sigma_N^2} = 2 \cdot (P_{NC} - P_C) \quad (17)$$

The estimated noise variance of (17) may be used to eliminate the residual noise power contributions in the nominator and denominator of (15), i.e.

$P_C' = P_C - [\widetilde{\sigma_N^2}/(K+1)(L+1)]$ and $P_{NC}' = P_{NC} - \widetilde{\sigma_N^2}$.

Alternatively, instead of de-biasing both the nominator and denominator of (15), only one of the components can be adjusted by the noise variance difference of the two methods, i.e. $P_C' = P_C$ and $$P'_{NC} = P_{NC} - \left(\frac{K \cdot L - 1}{K \cdot L}\right)\widetilde{\sigma_N^2} \quad (18)$$

After handling the noise power difference of the two channel power estimation methods:

$$\frac{P_C'}{P_{NC}'} \approx \kappa \quad (19)$$

We can now define:

$$\Xi = \left| \frac{P'_C}{P'_{NC}} \right| \quad (20)$$

We can use $\Xi$ as a metric to determine the level of synchronization of the OFDM receiver.

Since the metric is sensitive to residual noise distortions, that is to say that if the SNR is low, it can be optionally filtered, e.g. using a first-order IIR filter, however, any other filtering method can be used (e.g. FIR, sliding window, etc.). Hence:

$$\overline{\Xi}[n] = (1-a) \cdot \overline{\Xi}[n-1] + a \cdot \Xi[n] \quad (21)$$

where:

$\Xi[n]$ is the instantaneous synchronization metric estimated at instant n as per equation (20), $\overline{\Xi}[n]$ is the filtered synchronization metric at instant n and a is the first-order IIR filter coefficient.

The filtering process preferably evaluates a number, N of measurements to be processed before the metric is evaluated. That is to say that the determining step 26 comprises the obtaining and comparing steps (20, 22, 24) being repeated N times to form N instantaneous synchronization metrics before determining whether the receiver and the transmitter are synchronized based on the comparison (the N instantaneous synchronization metrics), where N depends on the convergence time of the filter which depends on the selected filter coefficient as would be understood. When filtering takes place, the method can be used in lower SNR regions as the effect of noise is reduced. Metric $\overline{\Xi}$ can be used to evaluate the level of synchronization, however, in order to decide whether a re-synchronization procedure is needed between receiver and transmitter, a pre-determined threshold $\Xi_0 > 0$ may be used.

This is because the transmitter/receiver system can sustain small time/frequency offsets without being out of sync and therefore it should not be determined that a transmitter and receiver are "out-of-sync" within these sustainable offsets. Further, small offsets might still exist due to noise, even when the receiver is synchronized. Accordingly, a pre-determined threshold $\Xi_0$ may be set according to the receiver susceptibility to time and frequency offsets, and preferably the target SNR region where this metric should be reliable. The threshold $\Xi_0$ may be calibrated empirically by taking into account the required SNR region and the filter properties applied to $\overline{\Xi}$. $\Xi_0$ is preferably set to a value that corresponds to the middle of the power separation $\overline{\Xi}$ (after filtering) between the coherent and non-coherent power estimates for the lowest SNR value.

Figure 4:
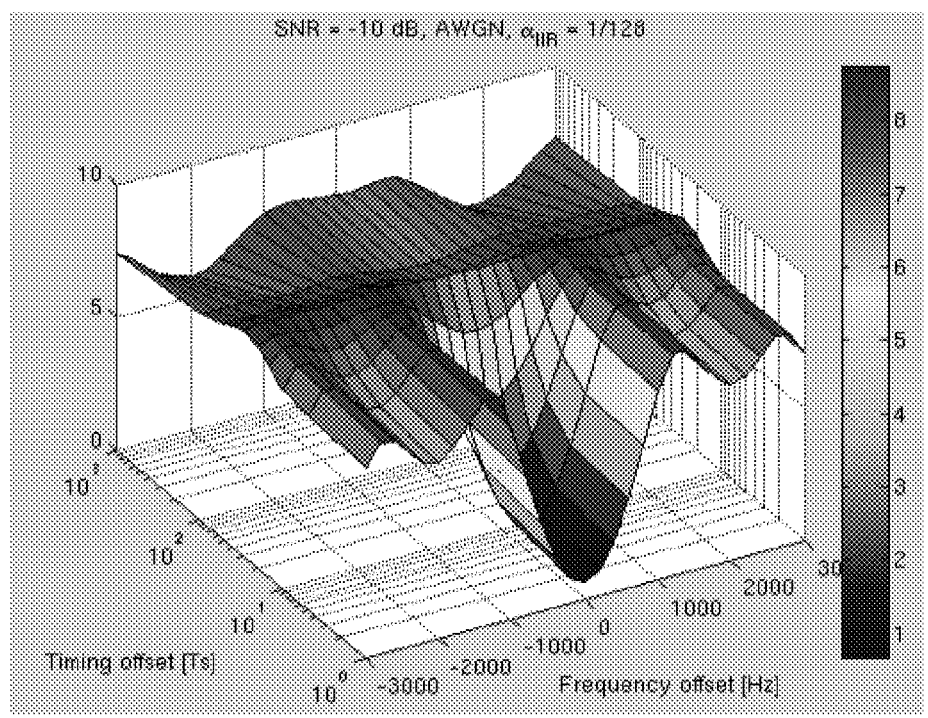
FIG. 4 illustrates average value of the synchronization metric according to the 15 disclosure for an AWGN channel, SNR=−10 dB and a filter coefficient α=1/128.

The following pseudo-code depicts a more detailed implementation for determining whether a receiver and transmitter are synchronized:

Step 1: Set n←0
Step 2: Estimate the non-coherent channel power $P_{NC}$ as per (12).
Step 3: Estimate the coherent channel power $P_C$ as per (14) using a small coherent unit.
Step 4: Estimate the noise variance $\widetilde{\sigma_N^2}$ as per (17).
Step 5: Estimate the coherent channel power $P_C$ as per (14) using a large coherent unit.
Step 6: Set $P_C' \leftarrow P_C$ and de-bias the non-coherent channel estimate $P_{NC}'$ as per (18).
Step 7: Derive the instantaneous synchronization metric $\Xi[n]$ as per (20)
Step 8: Optionally, filter the metric $\overline{\Xi}[n]$ as per (21). For n=0, set $\overline{\Xi}[-1] \leftarrow \Xi[0]$.
Step 9: Set n←n+1. If n<N go to Step 2 otherwise go to Step 10.
Step 10: Evaluate the synchronization of the UE:

If ($\overline{\Xi} < \Xi_0$)
    Indicate "in-sync"
else
    Indicate "out-of-sync"
end FIG. 4 shows the average value of the $\overline{\Xi}$ metric for an AWGN channel, SNR=−10 dB and a filter coefficient $\alpha = 1/128$. For small time and frequency rotations, the metric is estimated close to 0 dB, indicating that synchronization is maintained. As the time and frequency offsets increase, the metric is increased as expected.

Figure 5:
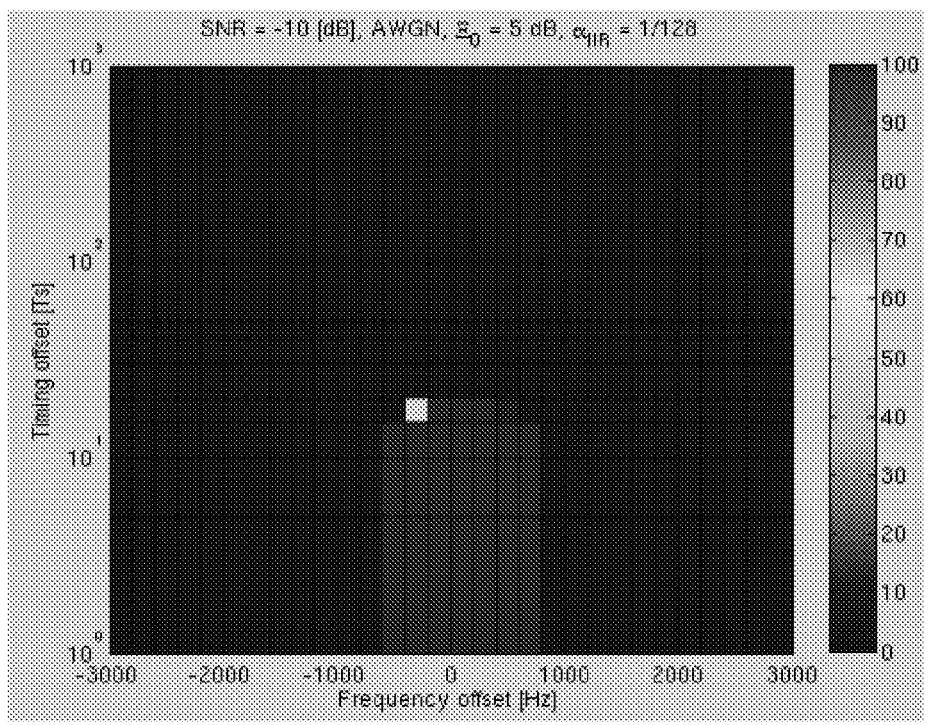
FIG. 5 illustrates the probability of indicating a receiver and transmitter are synchronized according to the disclosure.

FIG. 5 shows the probability of indicating "in-sync" derived from several evaluation occasions of the metric as a function of the time and frequency offsets. While the UE is within the "in-sync" area, the "in-sync" indication is 100%. When the UE moves out of the "in-sync" area, the "in-sync" indication probability goes to 0%.

In these figures the synchronization metric is measured in dB, the frequency offset is measured in Hz, and the timing offset in $T_S = 1/(15000 \times 2048)$ seconds ≈ 32 nanoseconds.

Disclosed herein is a method which can be used by an OFDM receiver to evaluate the level of synchronization of the OFDM system in the joint time/frequency plane. This method can be used to decide if the receiver needs to re-initiate the synchronization procedure or remain connected to the transmitter when the time and frequency drifts have exceeded the capture ranges of the corresponding estimators.

Since the method uses pilot symbols, the receiver does not need to process other signals to evaluate its synchronization status as would normally occur in known systems. This is useful, e.g. in LTE and in CatM devices, where PSS/SSS signals are available only every 5 ms and only within the central band. Thus, the UE can apply this method for an immediate evaluation without re-tuning to the central band.

The proposed method utilizes procedures that are already available at the receiver, i.e. non-coherent and coherent channel power estimates, and thus, it does not introduce significant additional signal processing effort and resource overhead.

Figure 9:
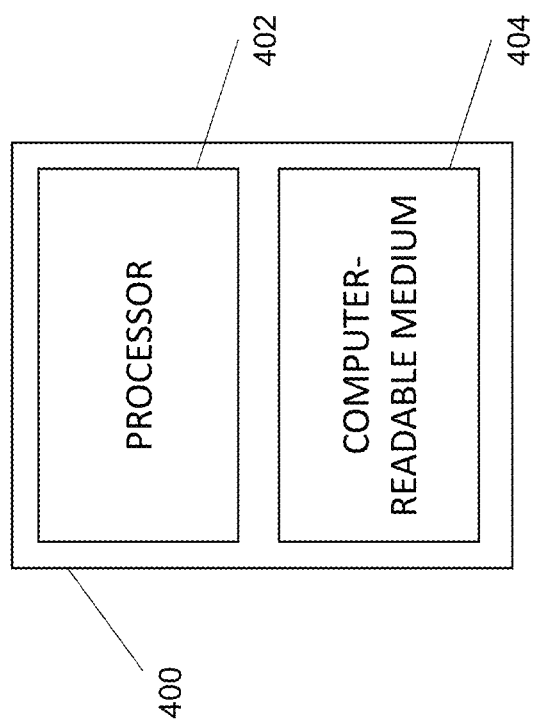
FIG. 9 illustrates an apparatus arranged to carry out the methods disclosed herein.

The various methods described above may be implemented by a computer program product. The computer program product may include computer code arranged to instruct a computer or processor 402 (e.g. as shown in FIG. 9) to perform the functions of one or more of the various methods described above. The computer program and/or the code for performing such methods may be provided to an apparatus 400 (e.g. as shown in FIG. 9), such as a computer or a processor 402, on a computer readable medium 404 or computer program product. The computer readable medium 404 may be transitory or non-transitory. The computer readable medium 404 could be, for example, an electronic, magnetic, optical, electromagnetic, infrared, or semiconductor system, or a propagation medium for data transmission, for example for downloading the code over the Internet. Alternatively, the computer readable medium 404 could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or processor may be configured in accordance with such code to perform one or more processes in accordance with the various methods discussed herein. Such an apparatus may take the form of a data processing system. Such a data processing system may be a distributed system. For example, such a data processing system may be distributed across a network.

The invention claimed is:

1. A method of evaluating orthogonal frequency division multiplexing (OFDM) synchronization between a transmitter and a receiver, the method carried out at the receiver and comprising:
    obtaining a non-coherent channel power estimate;
    obtaining a coherent channel power estimate;
    comparing the two estimates; and
    determining whether the receiver and the transmitter are synchronized based on the comparison.

2. The method of claim 1 wherein the determining is based on a pre-determined threshold.

3. The method of claim 2 wherein the pre-determined threshold is based on receiver susceptibility to time and/or frequency offsets.

4. The method of claim 3 wherein the pre-determined threshold is further based on a target signal-to-noise ratio (SNR) region.

5. The method of claim 1 wherein the determining comprises repeating the obtaining steps and comparing a pre-determined number of times, N, where N is an integer greater than zero, to form N instantaneous synchronization metrics.

6. The method of claim 5 wherein the determining is based on the N instantaneous synchronization metrics.

7. The method of claim 5 wherein each instantaneous synchronization metric is filtered to remove residual noise distortion.

8. The method of claim 7 wherein N is based on a convergence time of the filter.

9. The method of claim 1 wherein the comparing further comprises determining a noise variance to eliminate residual noise power from the non-coherent channel power estimate.

10. The method of claim 9 wherein the comparing further comprises using the noise variance to eliminate the residual noise power from the coherent channel power estimate.

11. The method of claim 9 wherein the noise variance is determined from the coherent channel power estimate of a small coherent unit.

12. The method of claim 1 where if it is determined that the receiver and the transmitter are not synchronized, performing re-synchronization of the receiver to the transmitter.

13. The method of claim 1 wherein obtaining the non-coherent channel power estimate is based on pilot symbols.

14. The method of claim 13 wherein obtaining the non-coherent channel power estimate is further based on a multiplication of received signal samples at cell reference signal (CRS) positions and conjugate of the corresponding CRS.

15. The method of claim 1 wherein obtaining the coherent channel power estimate is based on pilot symbols.

16. The method of claim 15 wherein obtaining the coherent channel power estimate is further based on a number of pilot signals within a coherent unit in frequency and time.

17. A processor programmed with instructions that when executed by the processor, cause the processor to carry out the method of claim 1.

18. The processor of claim 17 wherein the processor is positioned in a user equipment (UE).

19. A non-transitory computer readable medium comprising instructions that when executed by a processor, cause the processor to carry out the method of claim 1.

* * * * *